H. F. KRANTZ.

SWITCHBOARD.

APPLICATION FILED JAN. 19, 1918.

Reissued Apr. 8, 1919.

14,631.

WITNESSES:

Fred. C. Wilharm

J. H. Procter

INVENTOR

Hubert F. Krantz

BY

Wesley G. Carr

ATTORNEY

UNITED STATES PATENT OFFICE.

HUBERT F. KRANTZ, OF BROOKLYN, NEW YORK, ASSIGNOR, BY MESNE ASSIGNMENTS, TO KRANTZ MANUFACTURING COMPANY, INC., A CORPORATION OF NEW YORK.

SWITCHBOARD.

14,631. Specification of Reissued Letters Patent. Reissued Apr. 8, 1919.

Original No. 1,172,371, dated February 22, 1916, Serial No. 651,565, filed September 27, 1911. Application for reissue filed January 19, 1918. Serial No. 212,813.

*To all whom it may concern:*

Be it known that I, HUBERT F. KRANTZ, a citizen of the United States, and a resident of Brooklyn, in the county of Kings and State of New York, have invented a new and useful Improvement in Switchboards, of which the following is a specification.

The object of this invention is to improve the construction of switch boards and the like, to simplify the connections, reduce joints and thus improve the efficiency of the board.

Another object is to provide a compact and inexpensive switchboard in which a maximum clearance is provided between conducting portions of unlike polarity.

In carrying out the invention, my switch board is adapted to make immediate contact between the switch plates and the bus bars, which supply current to the board. I am thus enabled to greatly reduce the cost of a switch board as well as to reduce the number of connections for the installing wire man, and so prevent disasters if the work is not properly installed.

In carrying out my invention, I provide an insulating slate back plate and run the bus bars in a plane extending vertically parallel with one face of the same, connecting them with a source of power in the ordinary way. The various circuits to be supplied are led to the board by conductors, and not by the conventionally arranged cross bars usually intervening between the bus bars and the conductors. They are brought through from the opposite side of the board, and fastened to lugs of switches, which switches are mounted on the same side of the back plate as the bus bars, but spaced away from the same, preferably by insulating blocks. Such switches are so mounted that their brushes or blades, when the switch is operated, will come into contact directly with a bus bar. There is an advantage in this construction, particularly when the blade or brush is mounted in line with a bus bar, although in all cases this might not be necessary. Fuses or the like may be carried by the insulating block between the lug and the switch blade or brush.

The scope of my invention will be pointed out in the claims.

Figure 2:
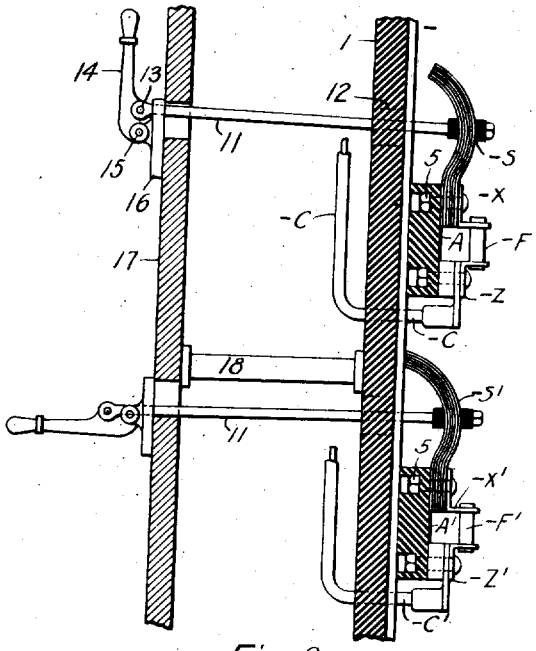
Figure 1:
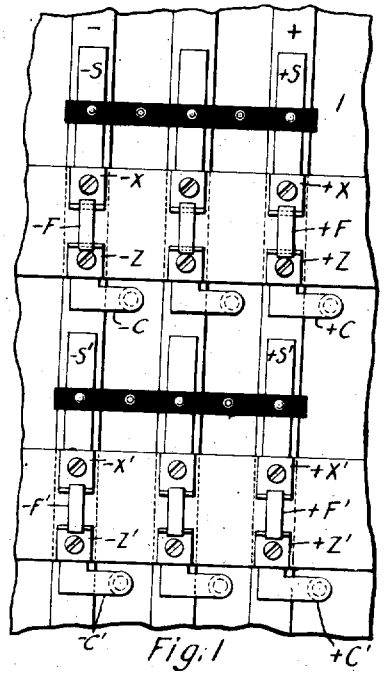

In the accompanying drawings: Figure 1 is a face elevation of a portion of a switch board, sufficient to illustrate my invention in connection with two switches. Fig. 2 is a section cut by plane N in Fig. 3.

Figure 3:
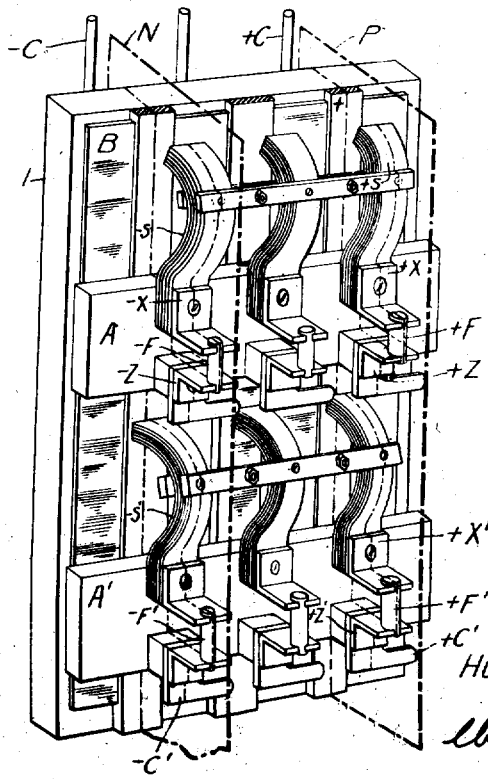

Fig. 3 is a perspective of the arrangement shown by Figs. 1 and 2 diagrammatically exemplifying the various primary planes of this arrangement and the relation of the various elements thereto. The peculiar relation between the primary elements of this combination, as shown in Fig. 1, may be more easily analyzed by reference to Fig. 3 which shows the same structure in perspective. The disposition of these elements will be explained in conjunction with what may be regarded as the three primary planes of the combination. These are indicated by B, P and N; B being a plane common to the positive and negative bus-bars indicated by + and — respectively, and extending parallel with the base-board 1. N is a plane arranged transversely to plane B and containing and defined by the longitudinal axis of the negative bus-bar —; said bus-bar being elongated and extending adjacent to and parallel with a face of the base-board 1. This plane N also contains the several negative switch-blades —S and —S′, etc., and also contain certain auxiliary parts. Just as the plane N defines the various negative elements of the switch-board, so also in like manner the adjacent parallel plane P defines the position of the various positive elements. That is to say, plane P longitudinally intersects the elongated bus-bar + and extends parallel with plane N and transversely to the plane B common to the bus-bars of different polarities. The plane P contains the various positive switch-blades +S and +S′, and also certain other parts as will be described. It is to be noted that the negative switch-blades —S and —S′ are all arranged in alinement in endwise succession; *i. e.*, tandemwise, and they swing or move in the plane N and are spaced apart endwise so that their appropriate ends may swing directly into contact with the negative bus-bar. A similar relation obtains with respect to the positive switch-blades and, furthermore, it is to be noted that the positive and negative switch-blades are also disposed so as to lie in alinement in pairs; *i. e.*, the switches —S and +S form the advance pair and the switches —S′ and +S′ forming the following pair; it being noted that the members of each pair or set differ in polarity. Combined and coöperating with these elements are a series of elongated insulating supports A, A′ which are parallel with one another and with the plane B and which extend in a direction transverse to planes N and P so as to cut the same; preferably at the side of the bus-bars remote from the base-board 1. These supports of insulating material are spaced apart along the length of the bus-bars and they carry switch terminals $-x$ and $-x'$, which like the corresponding switch-blades −S and −S′ are disposed in the plane N extending longitudinally of the −bus-bar, and in like manner switch-blade terminals $+x$ and $+x'$ are located in the adjacent parallel plane P; and it is noted that the terminal $-x$ is in opposition to the terminal $+x$ and the terminal $-x'$ is in opposition to the terminal $+x'$ in the same manner as the switch blades of opposite polarities. Also mounted by the elongated insulating strips A and A′ are branch line terminals $-z$ and $-z'$ of negative polarity and preferably located also in the plane N; and the branch-line terminals of positive polarity $+z$ and $+z'$ are similarly located with respect to the plane P. The various negative terminals are preferably connected by means of a conventional fuse −F or −F′; and the positive terminals by the fuse +F or +F′. In case a neutral bus-bar is used, as indicated by Fig. 1, the construction will be duplicated with respect to that part, as will be explained from the foregoing.

From the foregoing it will be perceived that the various primary elements of this switch-board are arranged and related to one another in a peculiar way which enables various branch line circuits −C, +C, −C′ and +C′ to derive current in a very direct manner from appropriate bus-bars, and it is noteworthy that the entire construction is very simple, being composed of very few elements and in all respects affording very direct contacts with the use of comparatively little metal. The switch-blades may advantageously be of laminated construction, as shown, and one end of the switch-blade may be clamped to the adjacent strip A or A′ by means of screws coöperating with the various terminals. The switch-blades may also be operated in a very direct and simple manner by means of connecting rods 11 attached to the switch-blades or brushes and passing through slotted openings 12 in the base-board 1. The other ends of said rods are secured to a stud 13 on a switch lever 14, which lever is pivoted at 15 to a block 16, mounted on a finishing face plate 17, for the switch board spaced apart from the main back board by struts or rods 18. The studs or pivots 13 and 15 of the switch arm are so arranged and designed that they shall be either in a dead center or just over a dead center when the brush is flexed by its contact with the bus bar, and thus permanently held and locked in position, although other means of insuring the contact may obviously be employed. This arrangement constitutes a toggle of the second order in which the link 11 forms the longer leg and in which the part extending between the pivot points 13 and 15 forms the shorter leg. In this instance, a member or support 16 is stationary and it provides the axis for a fixed or stationary pivot 15 about which the shorter lever arm swings. The pivot 13 is a floating pivot of the toggle, and when it occupies the position shown in the lower part of Fig. 2, the toggle is unbroken, and it holds the laminated resilient switch blade −S flexed against the bus-bar — so as to establish a good electrical contact for a considerable area. In this position the link lies across the axis of the fixed pivot and the parts are in "dead-center" position so that no amount of reaction on the part of the spring −S can disturb the toggle. However, by slightly moving the handle 14 which constitutes a means for breaking the toggle, the tension of the flexed switch-blade becomes immediately available to expedite the collapsing or breaking of the toggle, and the movement will be very rigid owing to the "kick" of the tensioned blade. By this arrangement of parts the group of conducting elements of a given polarity,—applying the term to a conductor of any type of current—is isolated from the group or groups of elements of other polarity. In fact, a slab or other plane sheet of insulating material may be mounted to extend the entire length of the board, separating the groups of conducting elements of unlike polarity, a construction heretofore wholly impractical in the art; and in this "free plane" of air or insulating material, completely and effectively separating all the conductors of one polarity from all the conductors of other polarity, resides a salient feature of the present invention.

The term "switch" as used in the claims is used with that broad meaning which includes modern fuses, some types of which may be pushed into and pulled out of place much as a switch blade is.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense. It is furthermore desired to be understood that the language used in the following claims is intended to cover all the generic and specific features of the invention herein described, and all statements of the scope of the invention which as a matter of language might be said to fall therebetween.

I claim as my invention:

1. A panel-board combining a board of insulating material, a positive and a negative bus-bar arranged parallel to each other and in a first plane parallel with said board; a first and a second positive terminal-piece located in a second plane containing said positive bus-bar and perpendicular to said board; a third and a fourth negative terminal-piece located in a parallel third plane containing said negative bus-bar; the first positive and third negative terminal-pieces being in a fourth plane transverse to said other planes; a first and a second positive switch-blade arranged tandem-wise in the second plane; the third and the fourth negative switch blade arranged tandem-wise in said third plane; and means for causing said switch-blades to move in their respective planes into contact with their respective bus-bars.

2. A panel-board combining a board of insulating material; a series of parallel bus-bars all arranged in the same plane and located adjacent one side of said board; a part located at one side of the plane of said bars; a series of laminated resilient switch-blades spaced apart sidewise and located at one side of said board and supported by said part and each extending parallel with its respective bar at the same side of said board; means for moving said switch-blades in planes parallel with the longitudinal axes of said bus-bars to cause them to press endwise against said bus-bars; and means establishing connections between said switch-blades and branch-line circuits.

3. A panel board combining a board of insulating material; an elongated bus-bar mounted to extend along one face of said board; a series of switch-blades mounted in endwise succession adjacent said bus-bar and all arranged in alinement, said bus-bar and said succession of switch-blades being all positioned in a common plane arranged transversely to said board; actuating means for bringing one end of each of said switch-blades directly into contact with said bus-bar; a series of branch-line circuits; a number of insulating supports extending transversely of said bus-bars; and a series of connecting elements mounted on said supports also located in said plane establishing electrical connection between said circuit and said switch-blade, all of said corresponding elements being identically located and arranged with relation to said bus-bar.

4. A panel-board combining a first strip of insulating material; a second strip of insulating material spaced therefrom and extending parallel therewith; a base-board located in a different plane from that common to the two strips; a series of branch-line terminals of different polarities spaced along said first strip; a series of parallel elongated bus bars of different polarities extending transversely to said strips, said bus-bars being spaced apart in correspondence with the spacing of said terminals; a second series of branch-line terminals of different polarities spaced along said second strip in correspondence with the spacing of said bus-bars; and a plurality of switch blades, each intervening between one of said termials and its adjacent bus-bar.

5. A panel-board combining a series of parallel elongated bus-bars of different polarities spaced apart in the same plane; a number of parallel strips spaced apart rearward of said bus-bars and extending transversely thereto; a branch-line terminal located on the rearward face of each strip adjacent its intersection with each bus-bar; and a plurality of switch-blades movable in planes transverse both to said above-mentioned plane and to said strips and parallel with said bus-bars and adapted to contact directly with said bus-bars.

6. A panel-board combining a number of spaced parallel strips of insulating material, a first positive bus-bar extending transversely to said strips at one side thereof; a positive fuse arranged on the other side of each strip, all of said positive fuses being located in a plane longitudinally containing said first bus-bar; a second negative bus-bar parallel with the first; a negative fuse on the other side of each strip, all of said negative fuses being located in a plane parallel to said first plane; switches movable in said planes to establish electrical connection between each fuse and its nearest bus-bar; and branch-circuits connected with each fuse.

7. A switch-board combining a stationary elongated contact-piece; two laminated resilient switch-blades arranged tandem; parts for supporting said switch-blades; a toggle connected to actuate each switch-blade, each toggle when unbroken being arranged to hold its switch-blade in a flexed state with its end pressed firmly against said common contact-piece, said toggle adapted when broken to release its strain on said blade; and means for actuating said toggle.

8. In a switchboard, the combination with a supporting member, of a bus-bar and a resilient switch member extending longitudinally in substantially the same direction upon one side of the supporting member, the switch member being disposed substantially wholly in face-to-face relation to the bus-bar, a toggle adapted, in its dead-center position, to flex the member into direct contact with the bus-bar, and means for operating the toggle.

9. In a switchboard, the combination with a supporting member, of an electrically continuous bus-bar and a coöperating switch member extending longitudinally in substantially the same direction, the switch member being disposed wholly in face-to-face relation to the bus-bar and being movable into, and out of, direct engagement with the bus bar surface, and means for actuating the switch member.

10. In a switchboard, the combination with a supporting member, of a bus-bar and a coöperating switch member extending longitudinally in substantially the same direction and arranged substantially in face-to-face relation, the said switch member being movable into, and out of, direct engagement with the bus-bar surface and the bus-bar being continuous opposite the switch member, and means for actuating the switch member.

11. In a switchboard, the combination with a supporting member and an electrically continuous bus-bar mounted on one face thereof, of a plurality of switch members disposed in end-to-end relation and wholly face-to-face with, and extending in the same direction and located upon the same side of the supporting member as, the bus-bar and also adapted to be flexed into, and out of, direct engagement with the bus-bar surface, and means for flexing the switch members.

12. In a switchboard, the combination with a panel, a conductor mounted upon one face thereof and a terminal laterally displaced from the contact face of the conductor and extending in the same direction as the conductor on the same side of the panel, of a movable switch member extending in the same direction as the conductor and serving to connect and disconnect said contact face and said terminal.

13. In a switchboard, the combination with a panel, a bus-bar mounted upon one face thereof and a terminal laterally displaced from the contact face of the bus-bar on the same side of the panel, of a movable switch member comprising flexible contact members extending longitudinally in the same direction as the bus-bar and serving to electrically connect and disconnect the bus-bar and said terminal.

14. In a switchboard, the combination with a panel, and a flat elongated bus-bar mounted upon one face thereof, of a terminal displaced laterally from the plane of the contact face of the bus-bar and extending in the same direction as the bus-bar on the same side of the panel, and a movable switch member extending in the same direction as the bus-bar and serving to connect and disconnect said contact face and said terminal.

15. In a switchboard, the combination with a supporting member, of a main conductor and a resilient switch member extending longitudinally in substantially the same direction upon one face of the supporting member, the switch member being disposed substantially wholly in face-to-face relation to the main conductor, and a link and lever mechanism for flexing the member into direct contact with the main conductor.

16. In a switchboard, the combination with a supporting member, of a main conductor and a resilient switch member extending longitudinally in substantially the same direction upon one face of the supporting member, the switch member being disposed substantially wholly in face-to-face relation to the main conductor, and a link and lever mechanism for flexing the member into electrical engagement with the main conductor.

17. In a switchboard, the combination with a panel, a bus-bar mounted upon one face thereof and a terminal displaced from the contact face of the bus-bar on the same side of the panel, of a switch member fixed on the terminal and extending longitudinally in the same direction as the bus-bar and movable into direct engagement with said contact face to connect the bus-bar to the said terminal.

18. In a switchboard, the combination with a panel, a bus-bar mounted thereon and a terminal laterally displaced from the bus-bar and extending in the same direction as the bus-bar on the same side of the panel, of a switch member that is adapted to be flexed to electrically connect the bus-bar and the terminal.

In witness whereof, I hereto affix my hand this 27th day of December, 1917.

HUBERT F. KRANTZ.

Witnesses:

VICTOR S. BEAM,

C. WESLEY POMEROY.